United States Patent

Bremer

(10) Patent No.: US 6,330,275 B1
(45) Date of Patent: *Dec. 11, 2001

(54) METHOD AND APPARATUS FOR OVERCOMING PERIODIC DISTURBANCES IN DIGITAL SUBSCRIBER LOOPS

(75) Inventor: Gordon Bremer, Clearwater, FL (US)

(73) Assignee: Paradyne Corporation, Largo, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,695

(22) Filed: Jun. 19, 1998

Related U.S. Application Data

(60) Provisional application No. 60/050,503, filed on Jun. 23, 1997.

(51) Int. Cl.[7] .................. H04B 3/00; H04L 25/00
(52) U.S. Cl. .................. 375/222; 375/346; 702/191
(58) Field of Search .................. 375/257, 222, 375/346; 379/416, 417; 455/63, 296

(56) References Cited

U.S. PATENT DOCUMENTS

| 3,699,444 | 10/1972 | Ghose et al. ............... 455/79 |
|---|---|---|
| 4,673,982 | 6/1987 | Tam, et al. ............... 348/607 |
| 4,736,455 | 4/1988 | Matsue et al. ............... 455/138 |
| 4,952,193 | 8/1990 | Talwar ............... 455/63 |
| 4,965,854 | 10/1990 | Glazebrrok ............... 455/63 |
| 4,992,798 | 2/1991 | Nozue et al. ............... 342/362 |
| 4,995,104 | 2/1991 | Gitlin ............... 370/201 |
| 5,029,118 | * 7/1991 | Nakajima et al. ............... 702/195 |
| 5,157,690 | 10/1992 | Buttle ............... 375/232 |
| 5,170,489 | 12/1992 | Glazebrook ............... 455/63 |
| 5,278,777 | * 1/1994 | Cummins ............... 702/195 |
| 5,345,476 | 9/1994 | Tsujimoto ............... 375/233 |
| 5,452,015 | 9/1995 | Hulyalkar ............... 375/346 |
| 5,572,262 | 11/1996 | Ghosh ............... 348/607 |
| 5,648,822 | 7/1997 | Hulyalkar ............... 348/607 |
| 5,966,684 | * 10/1999 | Richardson et al. ............... 702/191 |
| 5,995,566 | * 11/1999 | Rickard et al. ............... 375/346 |
| 5,995,567 | * 11/1999 | Cioffi et al. ............... 375/346 |
| 6,011,814 | 1/2000 | Martinez et al. ............... 375/233 |
| 6,173,021 | 1/2001 | Bingel et al. ............... 375/346 |

\* cited by examiner

*Primary Examiner*—Chi Pham
*Assistant Examiner*—Phuong Phu
(74) *Attorney, Agent, or Firm*—Thomas, Kayden, Horstemeyer & Risley, LLP

(57) ABSTRACT

The present invention provides a method and apparatus for eliminating or reducing local area and broad area interference in a twisted pair transmission system. The apparatus of the present invention comprises a detection device, such as an antenna, for example, for detecting electromagnetic interference coupled into a twisted pair line, a sampling/scaling device which samples and scales the detected signal, and a combiner device which combines a signal correction component with the signal received over the twisted pair by a differential receiver. The sampling/scaling device preferably comprises an analog-to-digital converter (ADC) which converts the detected analog signal into a digital signal and a digital signal processor which receives the digital signal from the ADC and processes the signal to generate a correction signal. The correction signal is then subtracted from the signal received by the differential receiver. The sampling/scaling device may be fixed or adaptive. If the interference is stationary in time, a fixed sampling/scaling device is suitable for use with the present invention. If the interference is non-stationary, preferably the sampling/scaling device will be adaptive such that the amount of scaling performed can be altered in accordance with changes in the interference signal detected by the detector.

19 Claims, 3 Drawing Sheets

METHOD AND APPARATUS FOR OVERCOMING PERIODIC DISTURBANCES IN DIGITAL SUBSCRIBER LOOPS

CROSS-REFERENCE TO RELATED APPLICATIONS

This application claims priority to and the benefit of the filing date of provisional application Ser. No. 60/050,503, filed Jun. 23, 1997, entitled "Overcoming Periodic Disturbances In Digital Subscriber Loops With Premise Wiring", which is incorporated herein by reference in its entirety.

TECHNICAL FIELD OF THE INVENTION

This invention generally relates to a method and apparatus for overcoming periodic disturbances in digital subscriber loops and, more particularly, to a method and apparatus which measures and/or records periodic-disturbance waveforms in premise wiring and which generates an inverse of the periodic-disturbance waveform which is used to cancel the periodic-disturbances.

BACKGROUND OF THE INVENTION

It is well known in the communications industry that noise or disturbances in a communications channel can adversely affect the performance of data communications equipment (DCE) using the channel. For example, it is well known that dial-up voice-frequency modems are constrained by noise in the channel to operate at less than their full capacity. This is why dial-up frequency modems do not always operate at their advertised maximum data rates. The performance of xDSL modems is also adversely affected by noise. In accordance with the present invention, it has been determined that periodic disturbances in premise wiring may adversely affect data communications equipment at the customer premises. Periodic impulse noise at the 60 Hz rate, which may be produced by radiating sources such as light dimmers, vacuum cleaners, blenders, etc., adversely affects data communications equipment at the customer premises. While these impairments may not adversely affect dial-up modems to a great extent, it is believed that they significantly adversely affect high-speed modems, such as DSL modems, because these types of modems utilize higher frequencies where pickup from radiating sources in the 60 Hz range may be greater.

Many DSL line coding techniques, such as discrete multi-tone (DMT), asymmetric digital subscriber line (DMT-ADSL), carrier less amplitude and phase modulation ADSL (CAP-ADSL), integrated services digital network (ISDN), and 2B1Q high-bit rate DSL (2B1Q-HDSL), do not attempt to communicate with general premise wiring but either (1) use a POTS splitter or filter to prohibit premise wiring disturbances above approximately 20 KHz from coupling into the DSL modem or (2) terminate the connection to the subscriber line at a single DSL modem such that the DSL modem does not communicate with any premise wiring. Therefore, coupling of premise wiring disturbances with frequencies above 20 KHz into the DSL communications channels is not a major problem. With respect to dial-up modems, coupling of periodic disturbances above approximately 4 KHz is not a problem because dial-up modems which operate over general premise wiring generally do not operate above 4 KHz. However, some DSL systems communicate over general premise wiring without a POTS splitter. In these cases, periodic disturbances coupled into the general premise wiring can significantly degrade performance.

If periodic disturbances contain only a relatively small number of frequency components within the data communication bandwidth, e.g., 1 to 15 disturbing frequency components, techniques such as precoding and data-feedback-equalization (DFE) can be used to improve performance. However, if there are many disturbing components within the data communication bandwidth, preceding and DFE techniques are impractical and can lead to other problems, such as long signal delays. With respect to periodic impulse disturbances in the 60 Hz range, these impulses imply a spectral content with energy at frequencies separated by 60 Hz, which is far too fine a separation to be dealt with by standard preceding or DFE techniques. At this frequency, the impulse period is about 16.67 milliseconds, which is too short to consider transmitting only between the impulses, especially since the impulses are likely to be spread over perhaps a millisecond.

Accordingly, a need exists for a method and apparatus which measures periodic impulse disturbances at the customer premises and which produces a counter measure which overcomes the disturbances to improve performance of data communications equipment located at the customer premises. Furthermore, in accordance with the present invention, it has been determined that canceling the periodic disturbance at one customer premise modem receiver will effectively cancel the disturbance on all customer premise modem receivers, due to the very close physical proximity of the modems relative to the frequency band of communication. Also, since both the periodic disturbance at issue and the transmitted countermeasure are generated nearly concurrently at the premise modem, the cancellation will be equally effective at the remote end of the subscriber loop, i.e., at the central office.

SUMMARY OF THE INVENTION

In accordance with the present invention, an impulse canceler is located at the customer premises for measuring and/or recording impulse disturbances produced by radiating sources at the customer premises and for generating an impulse disturbance countermeasure which effectively cancels the impulse disturbances on all premise modem receivers operating over the general premise wiring.

The impulse canceler may be implemented separately from any of the modems at the customer premises or, alternatively, may be incorporated into one of the DCEs at the customer premises. In accordance with the preferred embodiment of the present invention, the impulse canceler of the present invention is implemented within one of the DCEs at the customer premises. Alternatively, the impulse canceler of the present invention may be implemented at the central office, or remote-terminal end, if the periodic impulse disturbances are generated at the remote-terminal end instead of at the customer premises. However, it is expected that the periodic impulse noise will be generated at the customer premises rather than at the central office or remote-terminal end. Consequently, the impulse canceler of the present invention preferably is implemented at the customer premises.

In accordance with the preferred embodiment of the present invention, the impulse canceler of the present invention is incorporated into the DCE coupled to the first tributary at the customer premises. This DCE is designated at the "main" DCE. The DCE at the remote-terminal end is designated as the "master" DCE. Any other DCEs at the customer premises are connected to their respective tributaries and, in the event that the main DCE tributary drops off, the DCE at the next higher-number tributary will be designated as the new main DCE.

At the beginning of a data communication session, or at the beginning of any retrain session, a silence period is provided with a duration suitable to measure several periodic impulse disturbances that might exist. For 60 Hz disturbances, the duration of this period may be, for example, 200 milliseconds. During the silence period, all DCE transmitters are silenced and all line terminals are placed into their normal data communication mode. The main DCE then measures and/or records any impulse disturbances. Representations of the average waveform, or a suitable facsimile of the average waveform, and a representation of the period are then stored in memory. This may be accomplished by, for example, directly storing digital samples of the waveform or by analyzing the waveform and storing digital parameters which can be used to regenerate the waveform. The impulse canceler will then use these representations periodically to cancel the periodic disturbances. If the disturbances are time-stationary, then the cancellation will not need to be adaptive. However, if the disturbances are not time-stationary, the impulse canceler will adaptively alter the representations of the impulse waveform and period by tracking the amplitude and period of the disturbance waveform.

In accordance with an alternative embodiment of the present invention, the main DCE will develop a representation of the impulse disturbances by measuring the period of the impulse disturbance train, by creating a single pulse at the measured period which is input into a finite impulse response (FIR) equalizer, and by adapting the FIR equalizer to match and cancel the impulse disturbance.

As stated above, the impulse canceler effectively cancels the impulse disturbances not only on the main DCE, but also on the remote master DCE and on all other DCEs operating over the general premise wiring.

DETAILED DESCRIPTION OF THE PREFERRED EMBODIMENT

Figure 1:
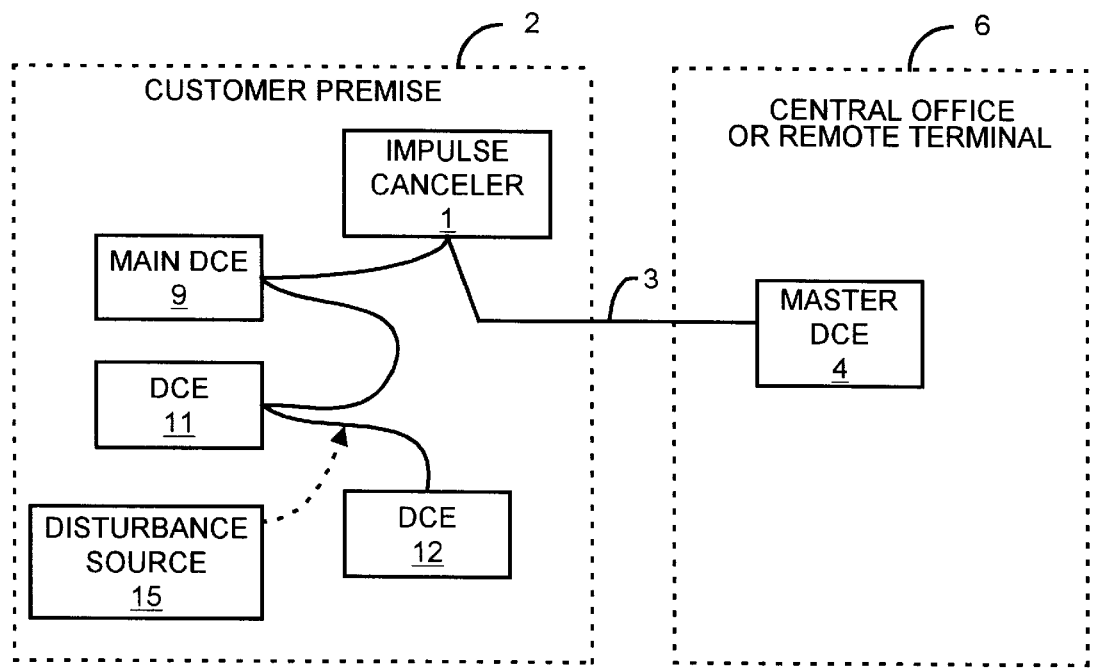
FIG. 1 is a functional block diagram of a customer premise connected to the central office or remote terminal via a subscriber line wherein the customer premise comprises a plurality of DCEs which communicate over the general premise wiring and an impulse canceler which generates an impulse disturbance cancellation signal to cancel out impulse disturbances created by sources at the customer premise.

FIG. 1 is a block diagram which illustrates the impulse canceler 1 of the present invention which is located at the customer premise 2. The impulse canceler 1 is connected to one end of a subscriber line 3 which is connected to a master DCE 4 located at a central office or remote terminal 6. The impulse canceler 1 is connected to the general premise wiring 7 at the customer premise 2. A first DCE 9, a second DCE 11 and a third DCE 12 are also connected to the general premise wiring 7 at the customer premise 2. The first DCE 9 is located at a first tributary station at the customer premise 2. The second DCE 11 is located at a second tributary station at the customer premise 2. The third DCE 12 is located at a third tributary station at the customer premise 2.

Figure 2A:
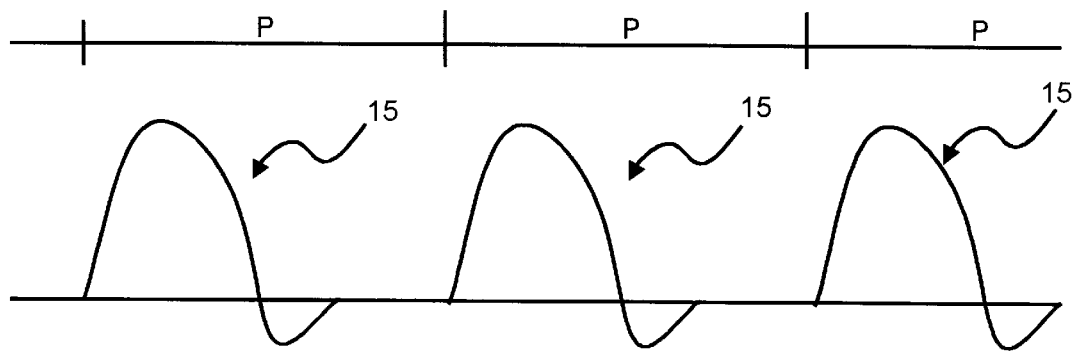
FIG. 2 illustrates impulse disturbance waveforms generated periodically and coupled into the general premise wiring at the customer premise illustrated in FIG. 1.
FIG. 2(b) illustrates the impulse disturbance cancellation signals generated by the impulse canceler illustrated in FIG. 1.
Figure 2B:
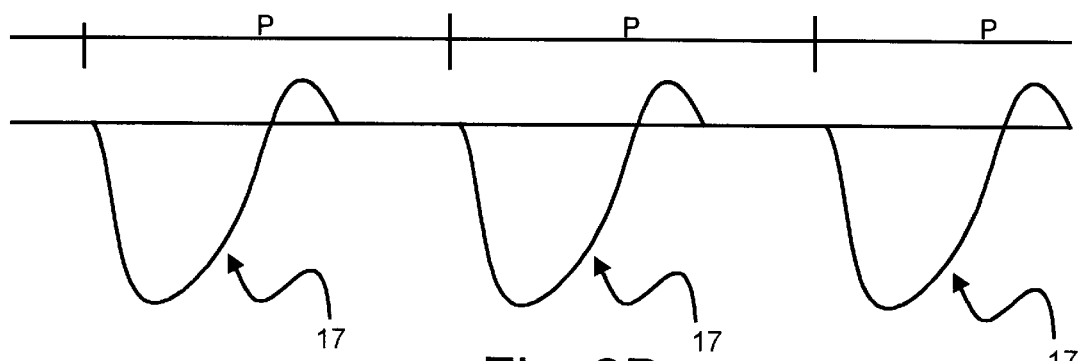

As stated above, periodic impulse noise in the 60 Hz range may be produced by sources located at the customer premise 2, such as, for example, light dimmers, vacuum cleaners, blenders, etc. These disturbance sources are collectively designated as disturbance source 15 shown in FIG. 1. These disturbance sources are capable of generating impulse disturbances which are coupled into the general premise wiring 7. Examples of impulse disturbance signals are illustrated in FIG. 2(a) as periodic signals 15. In accordance with the present invention, these disturbance impulses 15 are measured by the impulse canceler 1 and a representation of the disturbance signals 15 is stored in some type of memory device (not shown). The impulse canceler 1 of the present invention uses these stored representations to generate impulse cancellation signals, examples of which are illustrated in FIG. 2(b) as signals 17. If the impulses 15 are stationary in time, the impulse canceler 1 can determine when the impulses will occur by measuring the period of the impulse disturbances. The impulse canceler 1 will then combine the cancellation signal with the impulse disturbance signal 15 to cancel the impulse disturbance signal 15 and remove it from the general premise wiring 7. Alternatively, if the impulse disturbances 15 are not time-stationary, the impulse canceler 1 will adaptively alter the impulse cancellation signals by tracking the amplitude and period of the impulse disturbance signals, as more discussed in more detail below.

Figure 3:
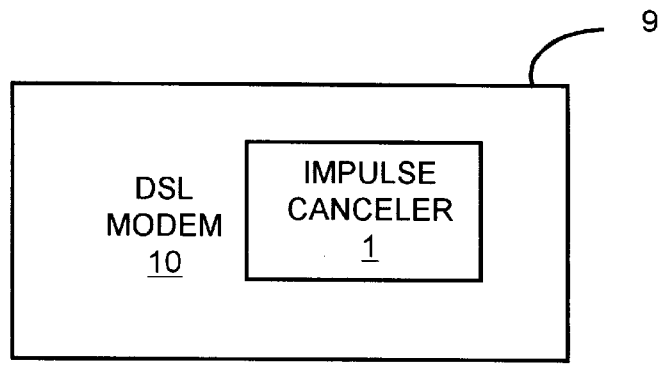
FIG. 3 is a functional block diagram illustrating the impulse canceler of FIG. 1 incorporated into a DSL modem wherein the DSL modem is comprised as the main DCE illustrated in FIG. 1.

FIG. 3 is a block diagram illustrating the preferred embodiment of the present invention wherein the impulse canceler 1 is incorporated into a DSL modem 10 which is comprised by the DCE 9 shown in FIG. 1. The DCE 9 located at the first tributary at the customer premise 2 and is designated as the main DCE. Preferably, the impulse cancellation will always occur in the DCE 9 located at the first tributary station in order to effectively cancel out impulse disturbances on the general premise wiring connected to all other DCEs at the customer premise 2. If the DCE 9 located at the first tributary station is taken off line, the DCE 11 located at the second tributary station may be designated as the main DCE and will preferably incorporate the impulse canceler 1. Similarly, if the first and second DCEs 9 and 11, respectively, are taken off line, DCE 12 may be designated as the main DCE and will preferably incorporate the impulse canceler 1. It should also be noted that the present invention is effective and beneficial even if only one DCE is located at the customer premise. FIG. 1 illustrates a plurality of DCEs merely for the purpose of demonstrating that one impulse canceler 1 is capable of effectively canceling impulse disturbances coupled into the general premise wiring 7 which would otherwise adversely affect all of the DCEs communicating over the general premise wiring.

Figure 4:
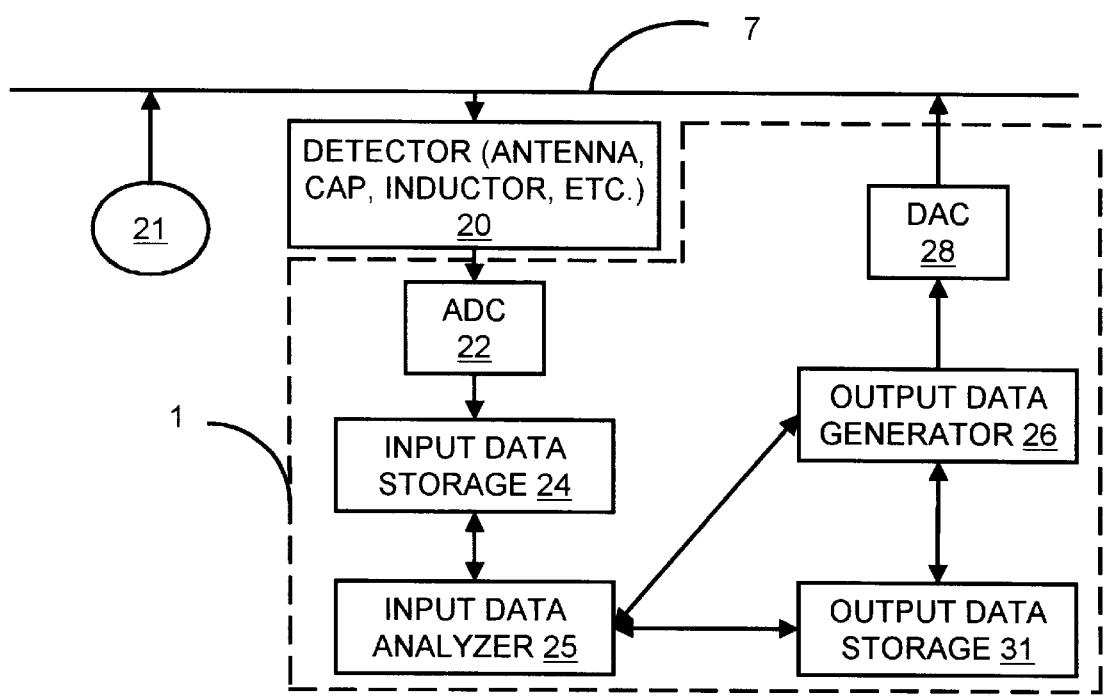
FIG. 4 is a functional block diagram illustrating the impulse canceler shown in FIG. 1 in accordance with a first embodiment of the present invention.

FIG. 4 is a block diagram illustrating the components of the impulse canceler 1 of the present invention in accordance with a first embodiment. A periodic disturbance source 21 is shown to indicate that the impulse disturbance can be viewed as an additive signal on the premises wiring 7. It should be noted that although the premises wiring is a wire pair, the premise wiring is shown as a single wire in FIG. 4 for purposes of illustrating the concepts of the present invention.

In accordance with this embodiment, the impulse canceler 1 comprises a detector 21 for detecting impulse disturbance signals progagating along wire 7, an analog-to-digital converter (ADC) 22 for sampling the impulse disturbances, input data storage device 24 for storing successive ADC samples that constitute a suitably accurate representation of the impulse disturbance produced by the periodic disturbance source 21, an input data analyzer 25 for determining parameters of the input data that are necessary for continuously generating representations of the disturbances. The detector 21 is any conventional detector such as an antenna, an induction coil, a capacitor, capable of detecting electromagnetic signals. The impulse canceler 1 also comprises an output data generator 26 which receives the output of the input data analyzer 25 and generates a digital cancellation signal which is output to a digital-to-analog converter (DAC) 28. The DAC 28 receives the digital cancellation signal and generates an analog cancellation signal which is output onto the premise wiring 7 for canceling the disturbance generated by the periodic disturbance source 21. The impulse canceler 1 also comprises an output data storage device 31 which stores the digital cancellation signal generated by the output data generator 26.

The ADC 22 sampling rate is selected in accordance with well known Nyquist theory so that it is high enough to unambiguously sample all signals expected on the premise wiring 7 resulting from the use of DSL modems. The sampling rate utilized by the ADC 22 also presents a high bridging impedance to the premise wiring 7. The input data storage device 24 receives successive digital samples from ADC 22 and stores digital representations of the disturbing waveform. The input data analyzer 25 then obtains the digital representations from the input data storage device 24 and determines an average impulse disturbance waveform which is composed of digital samples of the disturbing waveform. The input data analyzer 25 also determines an accurate frequency of occurrence of the disturbing waveform. These parameters preferably are determined by the input data analyzer 25 rapidly during an initial training period during which the modem signals on the premise wiring 7 are silent. Alternatively, the input data analyzer 25 may determine or adapt these parameters slowly while modem signals are present by utilizing longer-term averaging, as will be understood by those skilled in the art.

As stated above, the output data storage device 31 contains a representation of the impulse disturbance waveform obtained by the input data analyzer 25. The output data generator 26 utilizes this representation to generate the digital cancellation signal which is output to DAC 28. The output data generator 26 repeats this digital cancellation signal at the frequency of occurrence of the disturbance signal as determined by the input data analyzer 25. This digital cancellation signal is delivered to DAC 28 which converts the digital cancellation signal into an analog cancellation signal and adds it onto the premise wiring 7. The analog cancellation signal is added onto the premise wiring 7 in such a manner that the premise wiring 7 is not presented with an unsuitably low impedance from the impulse canceler 1, as will be understood by those skilled in the art. As discussed above with respect to FIGS. 2A and 2B, the analog cancellation signal is equal to and opposite of the disturbance signal. Therefore, no net disturbance is present on the premise wiring 7.

The sampling rate of DAC 28 is selected in a manner similar to that used to select the sampling rate for ADC 22, and in fact may be identical to the sampling rate selected for ADC 22.

It is advantageous in some implementations for the sampling rate of ADC 22 and DAC 28 to be an integer multiple of the impulse disturbance. In such a case, a phase locked loop (PLL) may be employed in conjunction with the impulse canceler 1 to cause the sampling rate to be frequency locked to the frequency of occurrence of the impulse disturbance generated by disturbance source 21. In other implementations, such frequency locking is not advantageous and interpolation methods may be employed instead to determine the frequency at which the cancellation signals should be generated by the output data generator 26. Interpolation methods that are suitable for this purpose are well known in the art and those skilled in the art will understand how these various interpolation methods may be implemented for this purpose.

Figure 5:
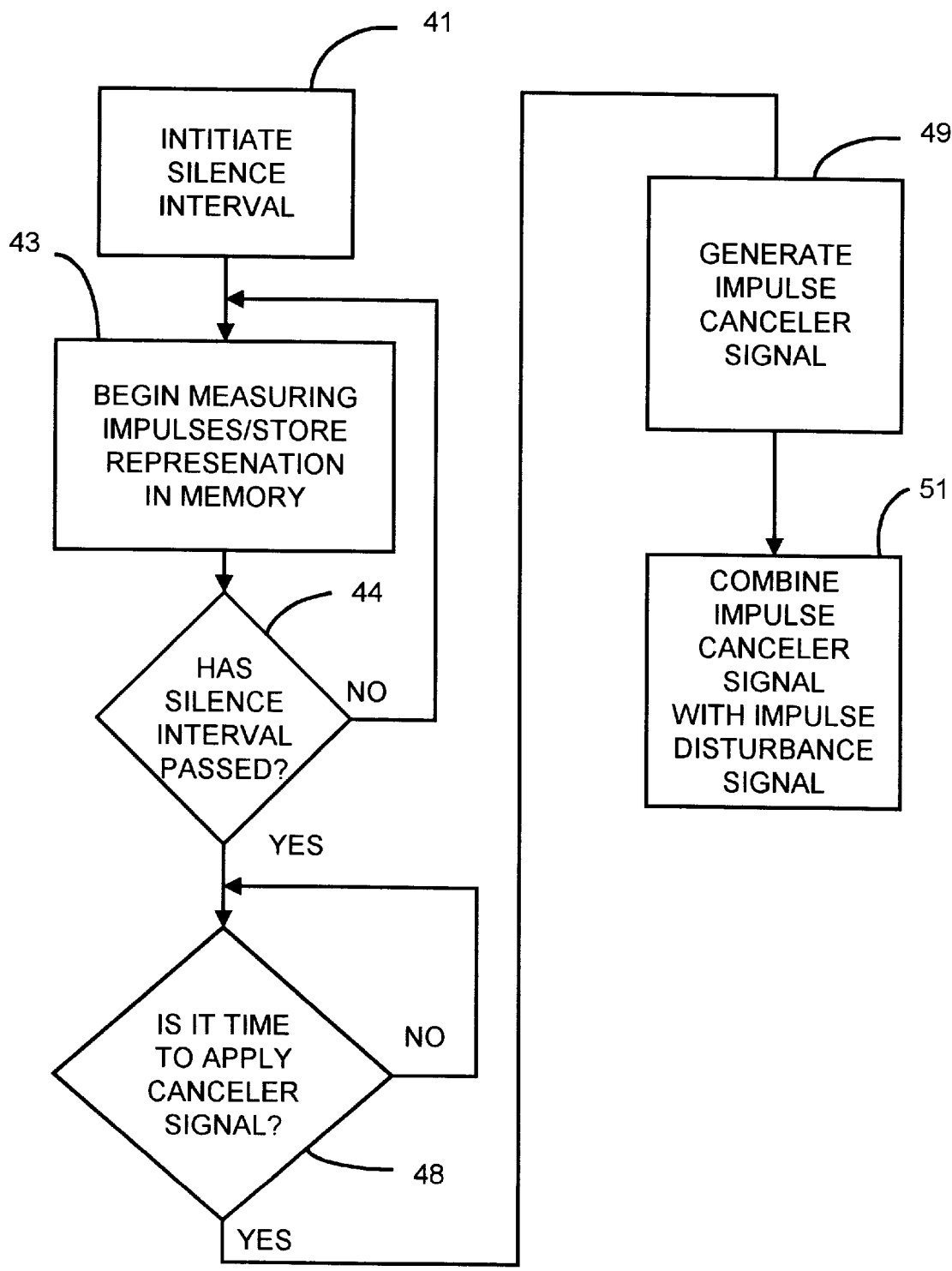
FIG. 5 is a flow chart illustrating the method of the present invention for generating an impulse cancellation signal and for combining the impulse cancellation signal with the impulse disturbance signal generated by a disturbance source at the customer premise for eliminating the impulse disturbance signal coupled into the general premise wiring at the customer premise.

FIG. 5 is a flow chart illustrating the method of the present invention for generating an impulse cancellation signal which removes the impulse disturbances coupled into the general premise wiring 7 at the customer premise 2. At the beginning of a data communication session, or at any designated retrain of the data communications session, a silence period is provided with a duration suitable to measure several of any periodic impairing impulses such as those shown in FIG. 2(a). For 60 Hz disturbances, the silence period may be, for example, approximately 200 milliseconds. Once the silence interval is initiated, as indicated by block 41, all DCE transmitters are silenced and all line terminations are placed in their normal data communication mode. The main DCE 9 then measures and/or records the disturbance impulses, as indicated by block 43. This results in a stored representation of the average waveform of the disturbance signal, or a suitable facsimile thereof, and a representation of the period of the impulse disturbance signal. This step of storing can be accomplished by directly storing the waveform samples or by analyzing the waveform and storing parameters suitable for regenerating the impulse disturbance waveform, as stated above.

Once the silence interval has lapsed, as indicated by block 44, the impulse canceler determines whether it is time to apply the impulse cancellation signal, as indicated by block 48. The timing with respect to the application of the cancellation signal depends on the period of the impulse disturbance signal, as discussed above. Once it is determined at block 48 that it is time to apply the cancellation signal, the impulse canceler 1 generates the impulse canceler signal, as indicated by block 49, and combines the impulse canceler signal with the impulse disturbance signal, as indicated by block 51.

It will be apparent to those skilled in the art that many variations and modifications can be made to the present invention without departing from the spirit and scope of the present invention. It should be noted that the present invention has been described with respect to particular embodiments for the purpose of describing the present invention, but that the present invention is not limited to these embodiments. It should also be noted that although the impulse canceler 1 of the present invention has been described as comprising certain components, some of these components may be implemented outside of the impulse canceler 1. For example, the impulse canceler has been described as comprising ADC 22 and DAC 28, but these components may be external to the impulse canceler 1, as will be understood by those skilled in the art. Similarly, input data storage device 24 and output data storage device 31 may also be external to the impulse canceler 1 and accessed by the impulse canceler 1.

It will also be understood by those skilled in the art that many of the functions performed by the impulse canceler 1 may be implemented in hardware and/or software. Therefore, the present invention should not be construed as being limited to any particular functional implementation. It will also be understood by those skilled in the art that the impulse canceler 1 of the present invention is not limited with respect to the frequency of the disturbance signals to be canceled. It will be understood by those skilled in the art that the impulse canceler 1 of the present invention may be designed to cancel a variety of periodic disturbances of different frequencies.

What is claimed is:

1. An apparatus for canceling periodic impulse noise coupled into a twisted wire pair of a transmission system, the periodic impulse noise being generated by a source external to the transmission system, the apparatus comprising:
    a receiver coupled to first ends of the twisted wire pair, the receiver receiving an electrical signal being propagated along the twisted wire pair;
    a detector disposed to detect a periodic impulse signal coupled into the twisted wire pair, the detector generating a signal relating to the detected periodic impulse signal;
    a sampling/scaling device coupled to the detector, the sampling/scaling device receiving the signal generated by the detector and sampling and scaling the signal to produce a representation of the signal generated by the detector, the sampling/scaling device utilizing the representation to generate a periodic impulse cancellation signal, the sampling/scaling device converting the periodic impulse cancellation signal into an analog periodic impulse cancellation signal;
    an adder device coupled to the twisted wire pair and to the sampling/scaling device, the adder device receiving the analog periodic impulse cancellation signal and adding the analog periodic impulse cancellation signal to the twisted wire pair, wherein the periodic impulse signal coupled into the twisted wire pair is reduced by the analog periodic impulse cancellation signal, and the electrical signal received by the receiver includes the reduced periodic impulse signal.

2. The apparatus of claim 1, wherein the periodic impulse is created by sources between a central office and a customer premises, the receiver being located at the customer premises and the twisted pair having second ends opposite the first ends, the second ends being coupled to the central office.

3. The apparatus of claim 1, wherein the periodic impulse is created by sources within a customer premises, and wherein the receiver is located at the customer premises.

4. The apparatus of claim 1, wherein the receiver is a differential receiver contained in a modem.

5. The apparatus of claim 1, wherein the detector is an antenna.

6. The apparatus of claim 1, wherein the detector is an induction coil located in proximity to the twisted wire pair.

7. The apparatus of claim 1, wherein the detector is a capacitor located in proximity to the twisted wire pair.

8. The apparatus of claim 1, wherein the sampling/scaling device comprises an analog-to-digital converter which converts the signal received from the detector into the digital representation, the sampling/scaling device comprising a signal processor which receives a digital representation from the analog-to-digital converter and processes the digital representation to generate the digital periodic impulse cancellation signal, and wherein the sampling/scaling device comprises a digital-to-analog converter which converts the digital periodic impulse cancellation signal into an analog periodic impulse cancellation signal.

9. The apparatus of claim 8, wherein the periodic impulse changes with respect to time and wherein the signal processor is an adaptive signal processor which adapts in accordance with changes in the periodic impulse.

10. A method for canceling periodic impulse noise coupled into a twisted wire pair of a transmission system, the periodic impulse noise being generated by a source external to the transmission system, the method comprising the steps of:
    receiving an electrical signal being propagated along the twisted wire pair;
    detecting a periodic impulse signal coupled into the twisted wire pair, the periodic impulse signal being created by the external source;
    generating a signal related to the detected periodic impulse signal;
    sampling and scaling the signal to produce a periodic impulse cancellation signal;
    converting the periodic impulse cancellation signal into an analog periodic impulse cancellation signal; and
    adding the analog periodic impulse cancellation signal to the twisted wire pair, wherein the periodic impulse signal propagating through the twisted wire pair is reduced by the analog periodic impulse cancellation signal, and the electrical signal received by the receiver includes the reduced periodic impulse signal.

11. The method of claim 10, wherein the step of sampling and scaling includes the steps of converting the generated signal into a digital signal and processing the digital signal in a signal processor in accordance with a pre-selected mathematical algorithm to produce the periodic impulse cancellation signal.

12. The method of claim 11, wherein the step of detecting is accomplished with an antenna.

13. The method of claim 11, wherein the step of detecting is accomplished with an induction coil located in proximity to the twisted wire pair.

14. The method of claim 11, wherein the step of detecting is accomplished with a capacitor located in proximity to the twisted wire pair.

15. A method of canceling periodic impulse noise from an electrical signal that is propagated through a twisted wire pair, the method comprising:
    detecting an periodic impulse signal being propagated through the twisted wire pair;
    sampling the detected periodic impulse signal to determine parameters for the periodic impulse signal;
    generating an periodic impulse cancellation signal using the parameters; and
    propagating the periodic impulse cancellation signal through the twisted wire pair, wherein the propagated periodic impulse cancellation signal combines with the propagating periodic impulse signal to produce a reduced periodic impulse signal.

16. The method of claim 15, further including the step of:
    receiving in a plurality of receivers coupled to the twisted wire pair an electrical signal propagating through the twisted wire pair, wherein the received electrical signal includes the reduced periodic impulse signal.

17. The method of claim 15, further including the steps of:

storing the parameters in a memory; and averaging the stored parameters to produce a set of average parameters that are utilized in generating the periodic impulse cancellation signal..

18. The method of claim 16, prior to the step of detecting, further including the step of:

initiating a silence interval during which all data communication equipment coupled to the twisted wire pair do not transmit any electrical signals to the twisted wire pair.

19. The method of claim 18, wherein the data communication equipment coupled to the twisted wire pair include a plurality of modems, each modem is adapted to receive and transmit electrical signals through the twisted wire pair and adapted to not transmit electrical signals through the twisted wire pairs during the silence interval.

* * * * *